(12) United States Patent
Murphy et al.

(10) Patent No.: US 12,400,422 B2
(45) Date of Patent: Aug. 26, 2025

(54) SENSOR FUSION APPROACH FOR PLASTICS IDENTIFICATION

(71) Applicant: X Development LLC, Mountain View, CA (US)

(72) Inventors: Gearoid Murphy, Mountain View, CA (US); Alexander Holiday, Brookfield, WI (US); Diosdado Banatao, Los Altos Hills, CA (US); Allen Zhao, Mountain View, CA (US); Shruti Badhwar, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 378 days.

(21) Appl. No.: 17/820,946

(22) Filed: Aug. 19, 2022

(65) Prior Publication Data
US 2023/0062938 A1    Mar. 2, 2023

Related U.S. Application Data

(60) Provisional application No. 63/236,967, filed on Aug. 25, 2021.

(51) Int. Cl.
*G06V 10/58*    (2022.01)
*G01J 3/28*    (2006.01)
(Continued)

(52) U.S. Cl.
CPC ............ *G06V 10/58* (2022.01); *G01J 3/2823* (2013.01); *G01J 3/40* (2013.01); *G06V 10/56* (2022.01);
(Continued)

(58) Field of Classification Search
CPC ...... G06V 10/58; G06V 10/56; G06V 10/774; G06V 10/806; G06V 20/64; G06V 10/143;
(Continued)

(56) References Cited

U.S. PATENT DOCUMENTS 5,040,229 A    8/1991   Lee et al.
5,835,633 A    11/1998  Fujisaki et al.
(Continued)

FOREIGN PATENT DOCUMENTS

AU    2014292179    12/2015
CN    102289673    12/2011
(Continued)

OTHER PUBLICATIONS

N. Audebert, B. Le Saux and S. Lefevre, "Deep Learning for Classification of Hyperspectral Data: A Comparative Review," in IEEE Geoscience and Remote Sensing Magazine, vol. 7, No. 2, pp. 159-173, Jun. 2019, doi: 10.1109/MGRS.2019.2912563 (Year: 2019).*

(Continued)

*Primary Examiner* — Santiago Garcia
(74) *Attorney, Agent, or Firm* — MUGHAL GAUDRY & FRANKLIN PC

(57) ABSTRACT

Methods and systems for using multiple hyperspectral cameras sensitive to different wavelengths to predict characteristics of objects for further processing, including recycling, are described. The multiple hyperspectral images can be used to predict higher resolution spectra by using a trained machine learning model. The higher resolution spectra may be more easily analyzed to sort plastics into a recyclability category. The hyperspectral images may also be used to identify and analyze dark or black plastics, which are challenging for SWIR, MWIR, and other wavelengths. The machine learning model may also predict the base polymers and contaminants of plastic objects for recycling. The hyperspectral images may be used to predict recyclability and other characteristics using a trained machine learning model.

19 Claims, 4 Drawing Sheets

(51) Int. Cl.
| | |
|---|---|
| *G01J 3/40* | (2006.01) |
| *G06V 10/56* | (2022.01) |
| *G06V 10/774* | (2022.01) |
| *G06V 10/80* | (2022.01) |
| *G06V 20/64* | (2022.01) |

(52) U.S. Cl.
CPC .......... *G06V 10/774* (2022.01); *G06V 10/806* (2022.01); *G06V 20/64* (2022.01); *G01J 2003/2826* (2013.01)

(58) Field of Classification Search
CPC ... G06V 2201/06; G06V 10/82; G01J 3/2823; G01J 3/40; G01J 2003/2826; G01J 3/28; H04N 23/11; B07C 5/342; G01N 21/3581; G01N 21/65; G01N 21/718; G01N 21/90; G01N 2021/3595; G01N 2021/845; G01N 2201/1296; G01N 21/359; G01N 21/3563
See application file for complete search history.

(56) References Cited

U.S. PATENT DOCUMENTS

| | | |
|---|---|---|
| 7,840,071 B2 | 11/2010 | Tang et al. |
| 8,164,673 B2 | 4/2012 | Horie |
| 8,284,991 B2 | 10/2012 | Tojo et al. |
| 8,406,469 B2 | 3/2013 | Fisher |
| 8,860,942 B1 | 10/2014 | Ewing et al. |
| 9,107,624 B2 | 8/2015 | Darty |
| 9,251,431 B2 | 2/2016 | Doepke et al. |
| 9,268,110 B2 | 2/2016 | Bueler et al. |
| 9,945,721 B2 | 4/2018 | Abolbashari et al. |
| 10,013,760 B2 | 7/2018 | Bhargava |
| 10,452,924 B2 | 10/2019 | Adato et al. |
| 10,453,197 B1 | 10/2019 | Cholakkal et al. |
| 10,515,715 B1 | 12/2019 | Pappas et al. |
| 10,520,482 B2 | 12/2019 | McPeek |
| 10,810,723 B2 | 10/2020 | Onoro-Rubio et al. |
| 2008/0118106 A1 | 5/2008 | Kilambi et al. |
| 2014/0122044 A1 | 5/2014 | Yasukawa |
| 2015/0021478 A1 | 1/2015 | Lee et al. |
| 2016/0358027 A1 | 12/2016 | Hotta et al. |
| 2017/0147905 A1 | 5/2017 | Huang et al. |
| 2017/0316285 A1 | 11/2017 | Ahmed et al. |
| 2018/0284273 A1 | 10/2018 | Buettgen et al. |
| 2018/0349770 A1 | 12/2018 | Nelson et al. |
| 2019/0026586 A1 | 1/2019 | Liu et al. |
| 2019/0065880 A1 | 2/2019 | Loginov et al. |
| 2019/0139193 A1 | 5/2019 | Navarrete Michelini et al. |
| 2019/0180153 A1 | 6/2019 | Buckler et al. |
| 2019/0205643 A1 | 7/2019 | Liu et al. |
| 2020/0237229 A1* | 7/2020 | Fei ................. A61B 5/4866 |
| 2022/0161298 A1* | 5/2022 | Kumar ................ B07C 5/342 |
| 2023/0053268 A1* | 2/2023 | Garcia, Jr. .......... B07C 5/342 |
| 2023/0120932 A1* | 4/2023 | Parr .................... B07B 1/14 |
| 2024/0074664 A1* | 3/2024 | Fei ................... H04N 23/11 |

FOREIGN PATENT DOCUMENTS

| | | |
|---|---|---|
| CN | 103942562 | 7/2014 |
| CN | 104050677 | 9/2014 |
| CN | 104077613 | 10/2014 |
| CN | 104732240 | 6/2015 |
| CN | 105528589 | 4/2016 |
| CN | 108921822 | 11/2018 |
| CN | 110084311 | 8/2019 |
| CN | 108052984 | 11/2019 |
| CN | 110647793 | 1/2020 |
| EP | 2208974 | 7/2010 |
| EP | 2942615 | 11/2015 |
| EP | 3567518 | 11/2019 |
| WO | 0169191 | 9/2001 |
| WO | 2007098123 | 8/2007 |
| WO | 2015007697 | 1/2015 |
| WO | 2016095117 | 6/2016 |
| WO | 2017130249 | 8/2017 |
| WO | 2017223206 | 12/2017 |
| WO | 2018141429 | 8/2018 |
| WO | 2018187632 | 10/2018 |
| WO | 2019084854 | 5/2019 |
| WO | 2019178561 | 9/2019 |
| WO | 2022170273 A1 | 8/2022 |

OTHER PUBLICATIONS

Niedermaier et al., Quantification and Classification in Process Analytics using Hyperspectral Imaging, Proceedings of SPIE, vol. 11144, Sep. 2019, pp. 1114409-1-1114409-11.

International Application No. PCT/US2022/041045, International Search Report and Written Opinion mailed on Nov. 11, 2022, 14 pages.

Signoret et al., MIR Spectral Characterization of Plastic to Enable Discrimination in an Industrial Recycling Context: II. Specific Case of Polyolefins, Waste Management, vol. 98, Oct. 2019, pp. 160-172.

Brix, Available Online at: https://en.wikipedia.org/wiki/Brix, Accessed from Internet on Sep. 23, 2021, 4 pages.

Chemical Detection, Teledyne FLIR, Available Online at: https://www.flir.com/threat-detection/chemical/, 2021, 3 pages.

Chemometrics, Available Online at: https://en.wikipedia.org/wiki/Chemometrics, Accessed from Internet on Sep. 23, 2021, 7 pages.

MobileNet V2, Pytorch Team, Available Online at: https://pytorch.org/hub/pytorch_vision_mobilenet_v2/, Accessed from Internet on Sep. 23, 2021, 2 pages.

MobileNetV2: The Next Generation of On-Device Computer Vision Networks, Google AI Blog, Available Online at: http://ai.googleblog.com/2018/04/mobilenetv2-next-generation-of-on.html, Apr. 3, 2018, 3 pages.

Optical Gas Imaging for the Chemical Industry, Flir.com, Available Online at: https://www.flir.in/discover/instruments/gas-detection/optical-gas-imaging-for-the-chemical-industry/, Aug. 2021, 5 pages.

Optical Sorting, Available Online at: https://en.wikipedia.org/wiki/Optical_sorting, Accessed from Internet on Sep. 23, 2021, 7 pages.

Resnet101, MathWorks, Available Online at: https://www.mathworks.com/help/deeplearning/ref/resnet101.html;jsessionid=1a374f68ed8d150528c1ba657502, Oct. 24, 2018, 3 pages.

Tensorflow Count Objects in Image, Available online at: https://stackoverflow.com/questions/42375680/tensorflowcount-objects-in-image, Feb. 21, 2017, 2 pages.

The Ins and Outs of Using Post-Consumer Resin in Packaging, Canadian Plastics, Available Online at: https://www.canplastics.com/features/the-ins-and-outs-of-using-post-consumer-resin-in-packaging/, May 6, 2021, 4 pages.

Akai et al., Distortion-Adaptive Grape Bunch Counting for Omni-directional Images, 25th International Conference on Pattern Recognition (ICPR) Available Online at: https://arxiv.org/pdf/2008.12511.pdf, Aug. 28, 2020, 8 pages.

Alam et al., CRF Learning with CNN Features for Hyperspectral Image Segmentation, IEEE International Geoscience and Remote Sensing Symposium (IGARSS), Jul. 10-15, 2016, 5 pages.

Annibale et al., Optical Measurement of Focal Offset in Tunable Lenses, Optics Express, vol. 24, No. 2, Jan. 25, 2016, pp. 1031-1036.

Barbin et al., Near-Infrared Hyperspectral Imaging for Grading and Classification of Pork, Meat Science, vol. 90, No. 1, Jan. 2012, pp. 259-268.

Bargoti et al., Deep Fruit Detection in Orchards, IEEE International Conference on Robotics and Automation (ICRA), May 29-Jun. 3, 2017, pp. 3626-3633.

Baweja et al., StalkNet: A Deep Learning Pipeline for High-Throughput Measurement of Plant Stalk Count and Stalk Width, Field and Service Robotics, Nov. 2017, pp. 271-284.

Bonus et al., Objects Counting by Estimating a Density Map with Convolutional Neural Networks, Available Online at: https://towardsdatascience.com/objects-counting-by-estimating-a-density-map-with-convolutional-neural-networks-c01086f3b3ec, Sep. 27, 2019, 15 pages.

(56) References Cited

OTHER PUBLICATIONS

Brownlee, How to Configure Image Data Augmentation in Keras, Machine Learning Mastering, Available Online at: https://machinelearningmastery.com/how-to-configure-image-data-augmentation-when-training-deep-learning-neural-networks/, Apr. 12, 2019, 58 pages.

Chen et al., Predicting the Anthocyanin Content of Wine Grapes by NIR Hyperspectral Imaging, Food Chemistry, vol. 172, Apr. 1, 2015, pp. 788-793.

Cohen et al., Count-ception: Counting by Fully Convolutional Redundant Counting, Proceedings of the IEEE International Conference on Computer Vision, 2017, pp. 18-26.

Culurciello, Segmenting, Localizing and Counting Object Instances in an Image, Available Online at: https://towardsdatascience.com/segmenting-localizing-and-counting-object-instances-in-an-image-878805fef7fc, Oct. 26, 2017, pp. 1-8.

Cu-Nguyen et al., An Imaging Spectrometer Employing Tunable Hyperchromatic Microlenses, Light: Science & Applications, vol. 5, No. 4, Apr. 8, 2016, 9 pages.

Cu-Nguyen et al., Tunable Hyperchromatic Lens System for Confocal Hyperspectral Sensing, Optics Express, vol. 21, No. 23, Nov. 18, 2013, pp. 27611-27621.

Dahab et al., Automated Brain Tumor Detection and Identification Using Image Processing and Probabilistic Neural Network Techniques, International Journal of Image Processing and Visual Communication, vol. 1, No. 2, Oct. 2012, 5 pages.

Elmasry et al., Chemical-Free Assessment and Mapping of Major Constituents in Beef Using Hyperspectral Imaging, Journal of food Engineering, vol. 117, No. 2, Jul. 2013, pp. 235-246.

Gandhi, R-CNN, Fast R-CNN, Faster R-CNN, YOLO—Object Detection Algorithms, Towardsdatascience.com, Available Online at: https://towardsdatascience.com/r-cnn-fast-r-cnn-faster-r-cnn-yolo-object-detection-algorithms-36d53571365e, Jul. 10, 2018, 10 pages.

Gao et al., Counting Dense Objects in Remote Sensing Images, CoRR, Available Online at: https://arxiv.org/pdf/2002.05928.pdf, Feb. 14, 2020, 5 pages.

Gao et al., Intra-Ensemble in Neural Networks, CoRR, Available Online at: https://arxiv.org/pdf/1904.04466v1.pdf, Apr. 9, 2019, 11 pages.

Gao et al., PSCNet: Pyramidal Scale and Global Context Guided Network for Crowd Counting, CoRR, Available Online at: https://arxiv.org/pdf/2012.03597v1.pdf, Dec. 7, 2020, 11 pages.

Gat, Imaging Spectroscopy Using Tunable Filters: A Review, Proceedings of SPIE—The International Society for Optical Engineering, vol. 4056, No. 1, Apr. 2000, pp. 50-64.

Godi et al., SIMCO: SIMilarity-Based Object Counting, CoRR, Available Online at: https://arxiv.org/pdf/1904.07092.pdf, Oct. 13, 2020, 6 pages.

Goel et al., Low-Power Object Counting with Hierarchical Neural Networks, CoRR, Available Online at: https://arxiv.org/pdf/2007.01369.pdf, Jul. 2, 2020, 6 pages.

Gomez-Sanchis et al., Hyperspectral System for Early Detection of Rottenness Caused by Penicillium Digitatum in Mandarins, Journal of food Engineering, vol. 89, No. 1, Apr. 2008, pp. 80-86.

Gomez-Sanchis et al., Segmentation of Hyperspectral Images for the Detection of Rotten Mandarins, International Conference Image Analysis and Recognition, Jun. 2008, 2 pages.

Grajek, Counting Objects with Faster R-CNN, softwaremill.com, Available Online at: https://softwaremill.com/counting-objects-with-faster-rcnn/, Jun. 2, 2017, 20 pages.

Guan et al., Understanding the Ability of Deep Neural Networks to Count Connected Components in Images, CoRR, Available Online at: https://arxiv.org/pdf/2101.01386.pdf, Jan. 5, 2021, 7 pages.

Gupta et al., Hyperspectral Imaging Using Acoustic-Optic Tunable Filters, Part of the SPIE Conference on Automatic Target Recognition IX, vol. 3718, Apr. 1999, pp. 512-521.

Habermann et al., Supervised Band Selection in Hyperspectral Images Using Single-Layer Neural Networks, International Journal of Remote Sensing, vol. 40, No. 10, Dec. 2018, pp. 1-27.

Habermann et al., Unsupervised Hyperspectral Band Selection using Clustering and Single-Layer Neural Network, Revue Francaise de Photogrammetrie et de Teledetection, Societe Frarwaise de Photogrammetrie et de Teledetection, Jun.-Sep. 2018, pp. 33-42.

Halstead et al., Fruit Quantity and Quality Estimation using a Robotic Vision System, CoRR, Available Online at: https://arxiv.org/pdf/1801.05560.pdf, Jan. 17, 2018, 8 pages.

Hani et al., Apple Counting using Convolutional Neural Networks, IEEE/RSJ International Conference on Intelligent Robots and Systems (IROS), Oct. 2018, pp. 2559-2564.

Hu et al., Deep Convolutional Neural Networks for Hyperspectral Image Classification, Journal of Sensors, vol. 2015, Jul. 30, 2015, 13 pages.

Islam et al., Detection of Potato Diseases Using Image Segmentation and Multiclass Support Vector Machine, IEEE 30th Canadian Conference on Electrical and Computer Engineering (CCECE), Apr. 2017, pp. 30-33.

Iwai et al., Speeded-Up Focus Control of Electrically Tmrnble Lens by Sparse Optimization, Scientific Reports, vol. 9, No. 12365, Aug. 26, 2019, pp. 1-6.

Kahveci, How to Count Objects on the Image with Deep Learning Algorithms? Available Online at: https://www.researchgate.net/post/How-to-count-objects-on-the-image-with-deep-learning-algorithms, Apr. 30, 2020, 9 pages.

Kamruzzaman et al., Non-Destructive Prediction and Visualization of Chemical Composition in Lamb Meat Using NIR Hyperspectral Imaging and Multivariate Regression, Innovative Food Science & Emerging Technologies, vol. 16, Oct. 2012, pp. 218-226.

Kasmani et al., A-CCNN: Adaptive CCNN for Density Estimation and Crowd Counting, CoRR, Available Online at: https://arxiv.org/pdf/1804.06958.pdf, Apr. 20, 2018, 5 pages.

Kemker et al., Algorithms for Semantic Segmentation of Multispectral Remote Sensing Imagery Using Deep Learning, ISPRS Journal of Photogrammetry and Remote Sensing, Available Online at: https://arxiv.org/pdf/1703.06452.pdf, May 2018, 45 pages.

Koirala et al., Deep Learning for Real-Time Fruit Detection and Orchard Fruit Load Estimation: Benchmarking of 'Mango YOLO, Precision Agriculture, vol. 20, Feb. 28, 2019, pp. 1107-1135.

Lempitsky et al., Learning to Count Objects in Images, Advances in Neural Information Processing Systems, vol. 23, Dec. 2010, pp. 1-9.

Liu et al., Robust Fruit Counting: Combining Deep Learning, Tracking, and Structure from Motion, IEEE/RSJ International Conference on Intelligent Robots and Systems, Aug. 2018, 8 pages.

Lorenzo et al., Segmentation of Hyperspectral Images Using Quantized Convolutional Neural Networks, 21st Euromicro Conference on Digital System Design (DSD), Aug. 29-31, 2018, pp. 260-267.

Marsden et al., People, Penguins and Petri Dishes: Adapting Object Counting Models to New Visual Domains and Object Types without Forgetting, CoRR, Nov. 2017, pp. 8070-8079.

McGregor et al., Adaptive Hyperspectral Imager: Design, Modeling, and Control, Journal of Optics, vol. 17, No. 8, Aug. 2015, 11 pages.

Mikami et al., DeepCounter: Using Deep Leaning to Count Garbage Bags, IEEE 24th International Conference on Embedded and Real-Time Computing Systems and Applications (RTCSA), Jan. 9, 2019, 10 pages.

Millan et al., Dynamic Compensation of Chromatic Aberration in a Programmable Diffractive Lens, Optics Express, vol. 14, No. 20, Oct. 2006, pp. 9103-9112.

Nesteruk et al., Image Augmentation for Multitask Few-Shot Leaning: Agricultural Domain Use-Case, Available Online at: https://arxiv.org/pdf/2102.12295.pdf, Feb. 2021, 12 pages.

Noroozi et al., Representation Learning by Learning to Count, Proceedings of the IEEE International Conference on Computer Vision, 2017, pp. 5898-5906.

Rahnemoonfar et al., Deep Count: Fruit Counting Based on Deep Simulated Learning, Sensors, vol. 17, No. 4, Apr. 2017, 12 pages.

Sam et al., Switching Convolutional Neural Network for Crowd Counting, 2017 IEEE Conference on Computer Vision and Pattern Recognition, Jul. 2017, 9 pages.

(56) References Cited

OTHER PUBLICATIONS

Santos De Arruda et al., Counting and Locating High-Density Objects Using Convolutional Neural Network, CoRR, Available Online at https://arxiv.org/pdf/2102.04366.pdf, Feb. 8, 2021, 15 pages.

Segui et al., Learning to Count with Deep Object Features, Proceedings of the IEEE Conference on Computer Vision and Pattern Recognition, May 2015, pp. 90-96.

Shang et al., End-to-End Crowd Counting via Joint Learning Local and Global Count, 2016 IEEE International Conference on Image Processing, Sep. 2016, pp. 1215-1219.

Sharma, It's a Record-Breaking Crowd! A Must-Read Tutorial to Build your First Crowd Counting Model using Deep Learning, Analytics Vidhya, Available Online at: https://www.analyticsvidhya.com/blog/2019/02/building-crowd-counting-modelpython/, Feb. 18, 2019, 11 pages.

Shen et al., Liquid Crystal Integrated Metalens with Tunable Chromatic Aberration, Advanced Photonics, vol. 2, No. 3, May-Jun. 2020, pp. 1-7.

Sokhandan et al., A Few-Shot Sequential Approach for Object Counting, CoRR, Available Online at: https://arxiv.org/pdf/2007.01899v2.pdf, Jul. 2020, 19 pages.

Stein et al., Image Based Mango Fruit Detection, Localization and Yield Estimation Using Multiple View Geometry, Sensors, vol. 16, No. 11, Nov. 2016, pp. 1-25.

Suzuki et al., Estimation of Chemical Composition of Grass in Meadows using Hyperspectral Imaging, Environmental Control in Biology, vol. 46, No. 2, Jan. 2008, pp. 129-137.

Takahashi et al., A Novel Weight-Shared Multi-Stage CNN for Scale Robustness, IEEE Transactions on Circuits and Systems for Video Technology, vol. 14, No. 8, Available Online at: https://arxiv.org/pdf/1702.03505.pdf, Aug. 2015, pp. 1-13.

Tan et al., Cells Counting with Convolutional Neural Network, Intelligent Computing Methodologies, Jul. 2018, pp. 102-111.

Trajanovsk et al., Tumor Semantic Segmentation in Hyperspectral Images Using Deep Learning, International Conference on Medical Imaging with Deep Learning—Extended Abstract Track, Apr. 2019, 4 pages.

Walach et al., Learning to Count with CNN Boosting, Computer Vision, Sep. 2016, 17 pages.

Wang et al., Correcting Axial Chromatic Aberration in a Fixed Focal Plane, Near-Infrared Imaging System, CSBE/SCGAB Annual Conference, Jul. 16-19, 2006, 14 pages.

Xu et al., Dilated-Scale-Aware Attention ConvNet for Multi-Class Object Counting, CoRR, Available online at https://arxiv.org/pdf/2012.08149.pdf, Dec. 2020, 7 pages.

Yang et al., Reverse Perspective Network for Perspective-Aware Object Counting, Proceedings of the IEEE/CVF Conference on Computer Vision and Pattern Recognition, Jun. 2020, pp. 4374-4383.

Zhan et al., A New Hyperspectral Band Selection Approach based on Convolutional Neural Network, IEEE International Geoscience mid Remote Sensing Symposium, Jul. 23-28, 2017, pp. 3660-3663.

Zhang et al., Cross-Scene Crowd Counting via Deep Convolutional Neural Networks, Proceedings of the IEEE Conference on Computer Vision and Pattern Recognition, Jun. 2015, pp. 833-841.

Zhao et al., Chromatic Aberrations Correction for Imaging Spectrometer Based on Acousto-Optic Tunable Filter with Two Transducers, Optics Express, vol. 25, No. 20, Oct. 2, 2017, pp. 23809-23825.

Zhao et al., Spectral-Spatial Feature Extraction for Hyperspectral Image Classification: A Dimension Reduction and Deep Learning Approach, IEEE Transactions on Geoscience and Remote Sensing, vol. 54, No. 8, Aug. 2016, pp. 4544-4554.

Zhao et al., Using Deep Learning in Image Hyper Spectral Segmentation, Classification, and Detection, Fourth Seminar on Novel Optoelectronic Detection Technology and Application, vol. 10697, Feb. 20, 2018, 6 pages.

\* cited by examiner

SENSOR FUSION APPROACH FOR PLASTICS IDENTIFICATION

CROSS REFERENCE TO RELATED APPLICATION

This application claims the benefit of U.S. Ser. No. 63/236,967, filed Aug. 25, 2021, the entire content and disclosure of which is hereby incorporated by reference.

TECHNICAL FIELD

This specification generally relates to digital processing of images, and in particular improved image segmentation based on hyperspectral images and the estimation of sample properties, such as chemical composition, based on the segmented images.

BACKGROUND

Plastic products are predominantly single-use and frequently not recycled. Annual production of plastic worldwide is approximately 350 million tons, of which approximately 10% ends up being recycled, 12% is incinerated, and the remainder (78%) accumulates in landfills or the natural environment, where it takes nearly 500-1,000 years to degrade. Plastic production is expected to double by 2030 and triple by 2050. Recycling processes depend on accurate material characterization, sorting, and decomposition yield prediction.

In some recycling infrastructures, mixed streams of objects or materials are typically sorted using automated equipment or machinery that may distinguish materials by size, weight, density. Some approaches may take advantage of computer vision-based methods, that might incorporate various spectroscopy methods (e.g., UV-Vis, X-ray, Infrared). Currently, most industrial grade optical sorting equipment found in modern MRFs (material recovery facilities) use select bands in the near infrared range (700-1000 nm) to determine base polymer composition of plastics. However, not every material or element is characterized by these select regions in the near-infrared frequency bands.

Meanwhile, as there is continued pressure on the recycling industry to improve recycling efficiency, there is a growing need to better identify what composes plastic waste at a more granular, molecular level—i.e., the polymer blends, formulated additives and contaminants. Knowing this molecular composition of feedstock will directly relate to the quality, and thus the value, of recycled output (for both mechanical and chemical recycling). These and other needs are addressed.

SUMMARY

The present disclosure describes methods and systems for using multiple hyperspectral cameras sensitive to different wavelengths to predict characteristics of objects for further processing, including recycling. The different wavelengths can include NIR, SWIR, and/or MWIR. The multiple hyperspectral images can be used to predict higher resolution spectra (e.g., FTIR) by using a trained machine learning model. The higher resolution spectra may be more easily analyzed to sort plastics into a recyclability category. The hyperspectral images may also be used to identify and analyze dark or black plastics, which are challenging for SWIR, MWIR, and other wavelengths. The machine learning model may also predict the base polymers and contaminants of plastic objects for recycling. The hyperspectral images may be used to predict recyclability and other characteristics using a trained machine learning model.

Methods may include accessing a set of location-specific spectra. Each location-specific spectrum in the set of location-specific spectra may characterize an extent to which electromagnetic radiation at each of a first set of frequency bands was reflected by a material located at a physical location corresponding to the location-specific spectrum. A method may in addition include accessing a hyperspectral image of a region that includes the physical locations corresponding to the set of location-specific spectra. Methods may also include generating one or more predicted characteristics of one or more objects within the region by processing the set of location-specific spectra and the hyperspectral image in parallel using a machine learning model. Methods may further include outputting the one or more predicted characteristics.

Embodiments may include a computer-program product. A computer-program product may include accessing a set of location-specific spectra. Each location-specific spectrum in the set of location-specific spectra may characterize an extent to which electromagnetic radiation at each of a first set of frequency bands was reflected by a material located at a physical location corresponding to the location-specific spectrum. A computer-program product may in addition include accessing a hyperspectral image of a region that includes the physical locations corresponding to the set of location-specific spectra. A computer-program product may also include generating one or more predicted characteristics of one or more objects within the region by processing the set of location-specific spectra and the hyperspectral image in parallel using a machine learning model. A computer-program product may further include outputting the one or more predicted characteristics.

Embodiments may include a system. A system may include one or more data processors. A system may in addition include a non-transitory computer readable storage medium containing instructions which, when executed on the one or more data processors, cause the one or more data processors to perform a method. The method may include accessing a set of location-specific spectra, where each location-specific spectrum in the set of location-specific spectra characterizes an extent to which electromagnetic radiation at each of a first set of frequency bands was reflected by a material located at a physical location corresponding to the location-specific spectrum. A method may further include accessing a hyperspectral image of a region that includes the physical locations corresponding to the set of location-specific spectra. The method may in addition include generating one or more predicted characteristics of one or more objects within the region by processing the set of location-specific spectra and the hyperspectral image in parallel using a machine learning model. The method may also include outputting the one or more predicted characteristics.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
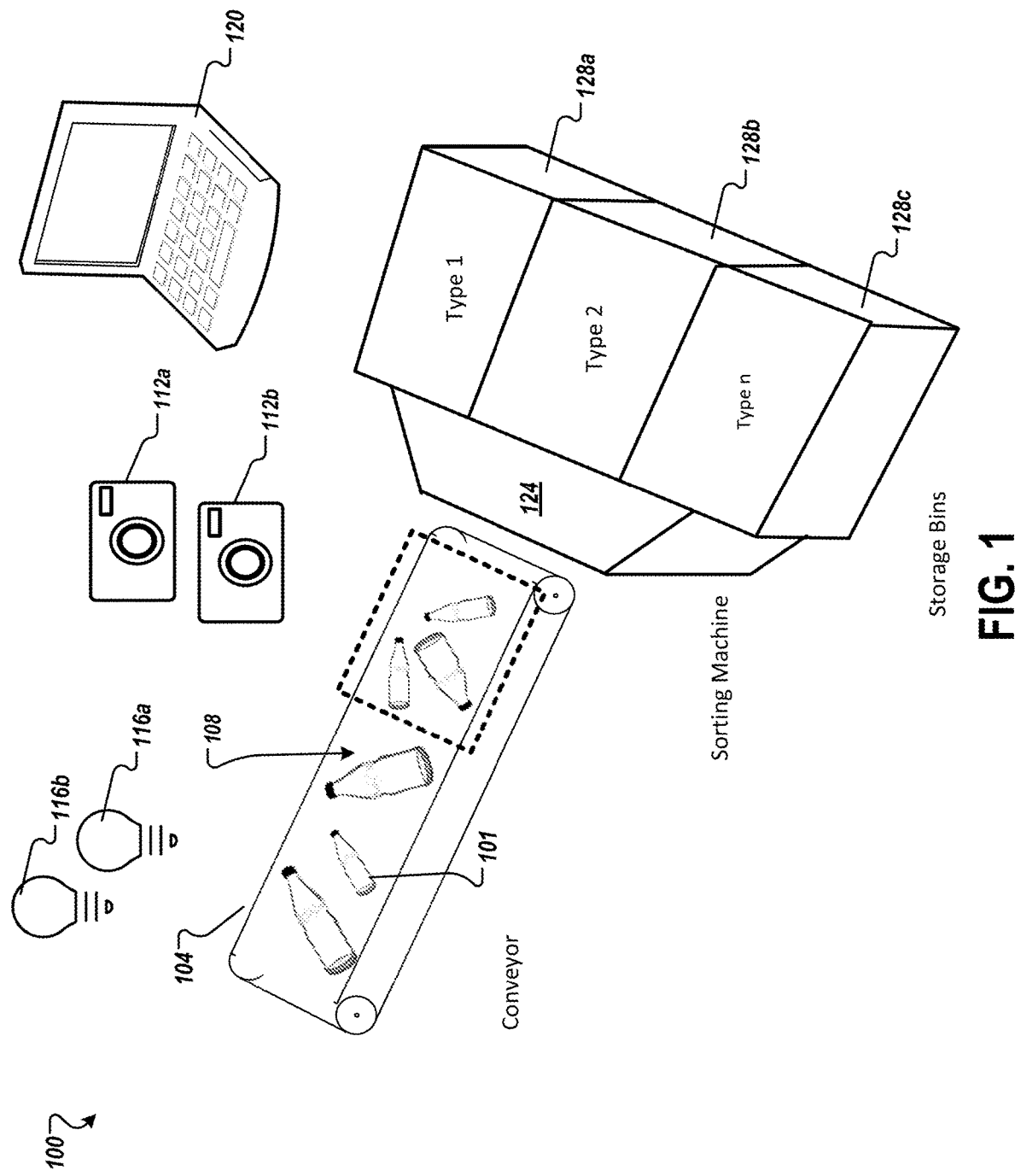
FIG. 1 shows an example system for identifying and sorting plastics according to embodiments of the present invention.

The ensuing description provides preferred exemplary embodiments only, and is not intended to limit the scope, applicability, or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Various regions of the electromagnetic energy spectrum (for example short-wave infrared [SWIR], 1000-3000 nm, and the mid-wave infrared region [MWIR]; 3000-5000 nm) can be used to distinguish between base polymers that make up plastics. However, these regions may also contain signatures of other materials, like inorganic fillers and additives, organic molecules like light stabilizers and plasticizers, or other matter like contaminants; oil, water, fats, sugars, starches, or other chemical that may have been contained in plastic packaging. Thus, intensities in spectra within this frequency range can be insufficient to accurately predict what type of polymer or plastic is in a given object or feedstock.

Black or dark materials present a special case for plastics identification. It is also problematic that many NIR (780-2500 nm) or even SWIR spectroscopy approaches have problems detecting black or dark materials and the makeup of black or dark materials, as the black color absorbs the light in these regions. Black plastics may be infused with carbon which gives it the black color but also absorbs the NIR radiation used by sorting machines at recycling facilities. Conveyor belts may be black or dark and determining the boundaries of plastic items against this background and other dark items is difficult. This prevents accurate identification of the underlying polymer materials (PET, PP, PE, etc.) and may cause potentially useful polymer material to be landfilled instead of being recovered. Thus, an insufficient amount of light is reflected to be analyzed to identify spectral features (and to thus characterize the material). Thus, most black or dark plastics and materials do not get properly sorted, and not collected for downstream recycling. Any polymer that has been infused with an IR absorbing material may also face these problems.

The present disclosure describes methods and systems for using multiple hyperspectral cameras sensitive to different wavelengths in order to predict characteristics of objects, including plastics for recycling. The different wavelengths can include NIR, SWIR, and/or MWIR. The multiple hyperspectral images can be used to predict higher resolution spectra (e.g., FTIR) by using a trained machine learning model. The higher resolution spectra may include spectra indicative of contaminants (e.g., polyvinyl chloride [PVC]), additives (e.g., phthalate additives) or base polymers. The higher resolution spectra may be more easily analyzed to sort plastics into a recyclability category. FTIR may not be used to sort plastics because of high expense and/or slow speed related to FTIR instruments. In some embodiments, the hyperspectral images may be used to predict recyclability and other characteristics using a trained machine learning model without predicting the high resolution spectra.

FIG. 1 shows an example system 100 for identifying and sorting plastics. Parts or all of system 100 may be used to implement processes disclosed herein. System 100 includes a conveyor 104 that conveys a waste stream 108. Waste stream 108 includes various plastic items, which include different base polymers. Waste stream 108 may include some dark or black plastics and other plastics. Waste stream 108 includes sample 101, which may be a plastic object, such as a container or bottle.

System 100 includes at least one hyperspectral camera 112a and at least one spectroscopy sensor integrated to collectively capture multiple spectral features of materials or objects, such as plastics, including dark or black plastics. The at least one spectroscopy sensor may be configured to capture signals from across a wide range of the electromagnetic energy spectrum (from X-Rays through THz/mm wavelengths—sensor fusion). System 100 may also include a second hyperspectral camera 112b and a second spectroscopy sensor. Hyperspectral camera 112a may be sensitive to a specific wavelength range. Hyperspectral camera 112b may be sensitive to a wavelength range different from hyperspectral camera 112a. Wavelength ranges include short-wavelength infrared (SWIR), middle-wavelength infrared (MWIR), near infrared (NIR), X-ray fluorescence, X-ray diffraction (XRD), millimeter-wave, and Fourier-transform infrared (FTIR). System 100 may include additional hyperspectral cameras. For example, system 100 may include a total of at least 3, 4, 5, or more hyperspectral cameras.

Light source 116a and light source 116b may illuminate samples in waste stream 108. Light source 116a may provide wavelengths to which hyperspectral camera 112a is sensitive. Light source 116b may provide wavelengths to which hyperspectral camera 112b is sensitive. For example, a light source may be a collection of high intensity halogen lights, which produce SWIR. In some embodiments, a light source may be one or more electric filament-based heaters with gold-plated reflectors, which produce MWIR. In some embodiments, a light source may be one or more light-emitting diodes (LEDs) that emit wavelengths in one or more of the wavelength ranges described herein. System 100 may include as many light sources as hyperspectral cameras, with a separate light source providing wavelengths suited for each hyperspectral camera.

Hyperspectral camera 112a and hyperspectral camera 112b capture light from light source 116a and light source 116b reflected off objects in waste stream 108 and parts of conveyor 104. An object may include a piece of plastic (e.g., bottle, container).

The signals collected by the hyperspectral camera and at least one spectroscopy sensor can be collectively processed by one or more machine learning models to generate accurate predictions about the characteristics of (e.g., composition of and/or properties of) the material or object. For example, a prediction may predict whether a material or object includes a given additive, any of a class of additives, a given contaminant, any of a class of contaminants, a given base polymer, or any of a class of base polymers. As another example, a prediction may predict which (if any) additive, contaminant, or base polymer is within the material or object. As yet another example, a prediction can include a predicted spectrum that has a higher resolution, a higher signal-to-noise, and/or wider frequency bands as compared to spectra that were initially captured and/or input into the model(s) (e.g., so as to transform a short-wave infrared spectrum or a mid-wave infrared spectrum into a near-infrared spectrum). The machine learning model may be executed by a computer system 120.

In some instances, the machine learning model(s) process one or more hypercubes. A hypercube may include two dimensions that correspond to physical space (e.g., x- and y-coordinates) and a third dimension that corresponds to frequency bands (e.g., a spectral dimension). In various instances, the signal(s) collected by the hyperspectral camera can be used to generate a hypercube and/or the signal(s) collected by the spectroscopy sensor can be used to generate a hypercube, and the machine learning model can process the hybercube(s). Processing of the hypercubes is described further in stage 220 of FIG. 2.

In some instances, an image collected by the hyperspectral camera can be used to segment the image and to identify a bounding box (e.g., in accordance with a technique disclosed in either or both of U.S. application Ser. No. 17/383,278, filed on Jul. 22, 2021 and Ser. No. 17/383,293, filed on Jul. 22, 2021, each of which is hereby incorporated by reference in its entirety for all purposes). The bounding box can then be used to identify a region in physical space to be represented in the hypercube(s).

The machine learning model(s) may have been generated or may be generated by training one or more neural networks on multiple spectral data points collected across a large integrated database of diverse spectral data. For example, the diverse spectral data can include spectra corresponding to two or more of: short-wavelength infrared (SWIR), middle-wavelength infrared (MWIR), near infrared (NIR), X-ray fluorescence, X-ray diffraction (XRD), millimeter-wave, Fourier-transform infrared. The large integrated database may further include chemical properties, physical properties, and/or meta data about the corresponding materials or objects. Such a training set may include tens of thousands of objects/samples). The machine learning models can be trained, configured, and/or used to correlate these spectra across a single object, such that when a similar object is scanned by lower resolution devices (such as a SWIR camera or MWIR camera), the higher resolution FTIR spectra were inferred using spectrum-inferring model. The spectrum-inferring model was configured to infer a higher resolution spectrum using a lower resolution spectrum. As an example, the lower resolution spectrum was sampled in a grid pattern and stacked to form model input. Then a convolutional layer extracted features from this series of spectra, which were sent to a self-attention encoder. The self-attention allowed the model to ignore noisy inputs, returning a cleaned series of output features that were condensed into a single vector, which served as the hyperspectral image's embedding. A multilayer perceptron then transformed the embedding into the target spectrum taken from the other, higher quality scans on separate instruments. As another example, lower resolution spectra from multiple hyperspectral cameras were transformed into reduced dimensionality feature spaces using convolutional neural networks. These features spaces were then fused and further processed with additional convolutional layers, max pooling layers, and drop out layers, returning a cleaned series of output features that were condensed into a single vector, which served as the hyperspectral image's embedding. An example of the higher resolution spectrum is FTIR spectrum 224 in FIG. 2.

The output of the machine learning model can be used to determine a classification of an object. A classification of the object may include the type of polymer, the recyclability of the object, the purity of the object, etc. Computer system 120 may direct sorting machine 124 to sort objects into bins 128a, 128b, and 128c for each classification of the polymer.

Figure 2:
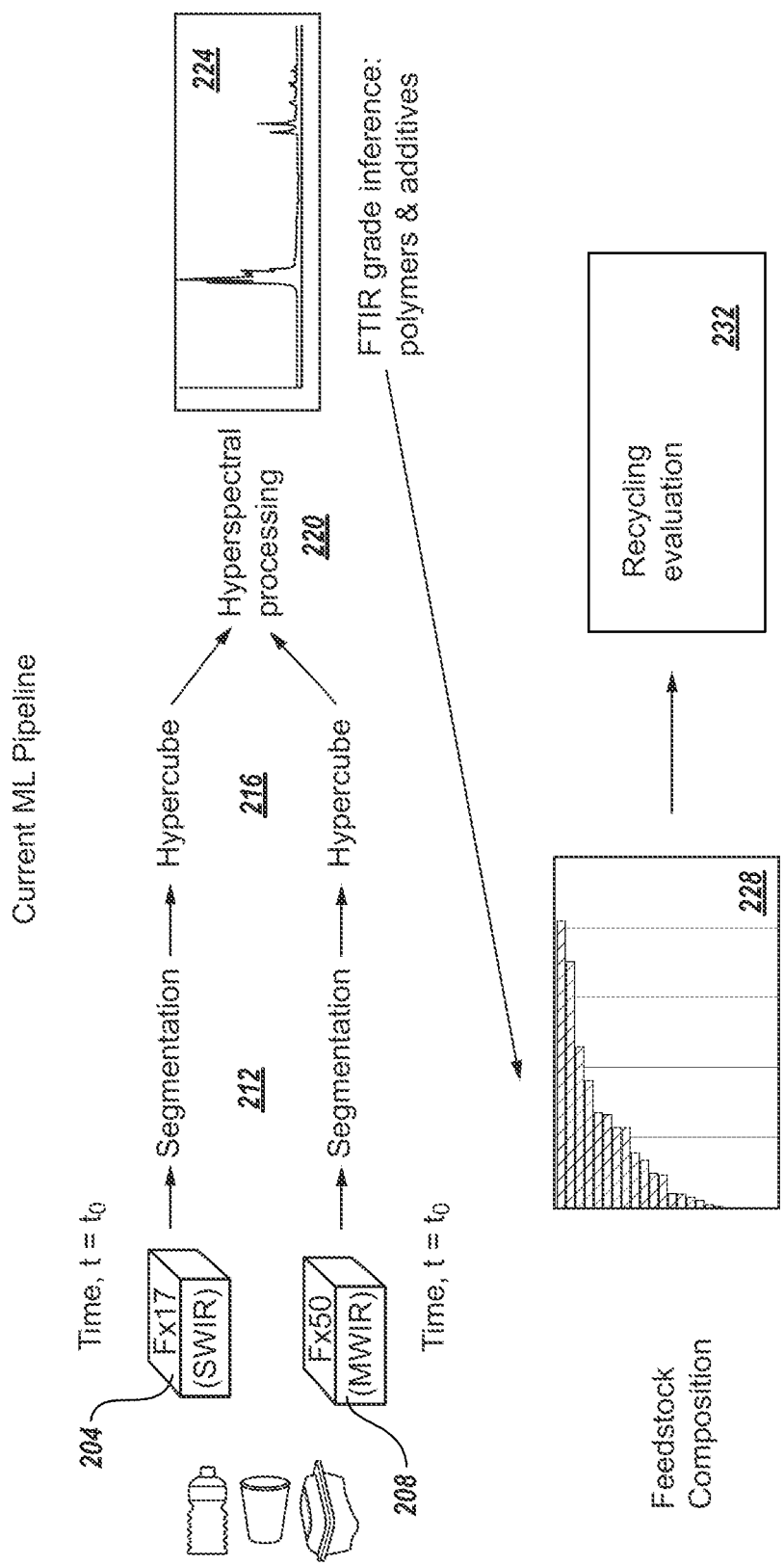
FIG. 2 illustrates example data inputs into a machine learning model and outputs of a machine learning model according to embodiments of the present invention.

FIG. 2 illustrates example data inputs into a machine learning model(s) and outputs of a machine learning model(s). Input data 204 and input data 208 are provided. Input data 204 and input data 208 may include particular wavelength ranges and may be obtained using hyperspectral camera 112a and hyperspectral camera 112b in FIG. 1. As illustrated, input data 204 includes SWIR hyperspectral data and input data 208 includes MWIR hyperspectral data. The hyperspectral data is segmented to identify pixels associated with an object in physical space. Segmentation may be performed by a machine learning model. At stage 216, the result of the segmentation is a hypercube. The hypercube includes the physical space dimensions, associated with an object. The hypercube also includes a dimension that corresponds to frequency bands.

At stage 220, the hypercubes undergo hyperspectral processing by a trained machine learning model. The machine learning model may be machine learning model 370 in FIG. 3. The hypercubes are fed into the machine learning model. The machine learning model predicts characteristics of the object based on the inputted hypercubes. As an example, a high resolution FTIR spectrum 224 may be predicted based on the inputted hypercubes. The FTIR spectrum 224 may then be analyzed to determine feedstock composition 228. Feedstock composition 228 may be determined through software that analyzes FTIR data. In some embodiments, inputted hypercubes may determine feedstock composition 228 without determining FTIR spectrum 224. FTIR spectra may be predicted because FTIR spectra can be an objective and accurate ground truth. Labeling materials by the base polymers for training can be subjective and inaccurate. Moreover, materials might not be labeled properly without an FTIR. Translating FTIR to an output vector may be difficult and can be solved separately of the machine learning model. Additionally, predicting the FTIR spectra can allow determining correlations in data. Certain wavenumbers in the FTIR spectra (e.g., fingerprint region) may correlate with certain base polymers or contaminants.

At stage 232, based on feedstock composition 228, different options for recycling (e.g., chemical [pyrolysis], mechanical) are evaluated. A benefit (environmental and/or financial) can be calculated based on the feedstock composition, and a recycling process, or the lack of one, can be identified for an item. The feedstock composition may include base polymers and types of contaminants (e.g., salts, silica, organochlorine, organic acids). The categories in stage 232 can be outputted to sorting machine 124 as the basis for bins 128a, 128b, and 128c in FIG. 1.

Figure 3:
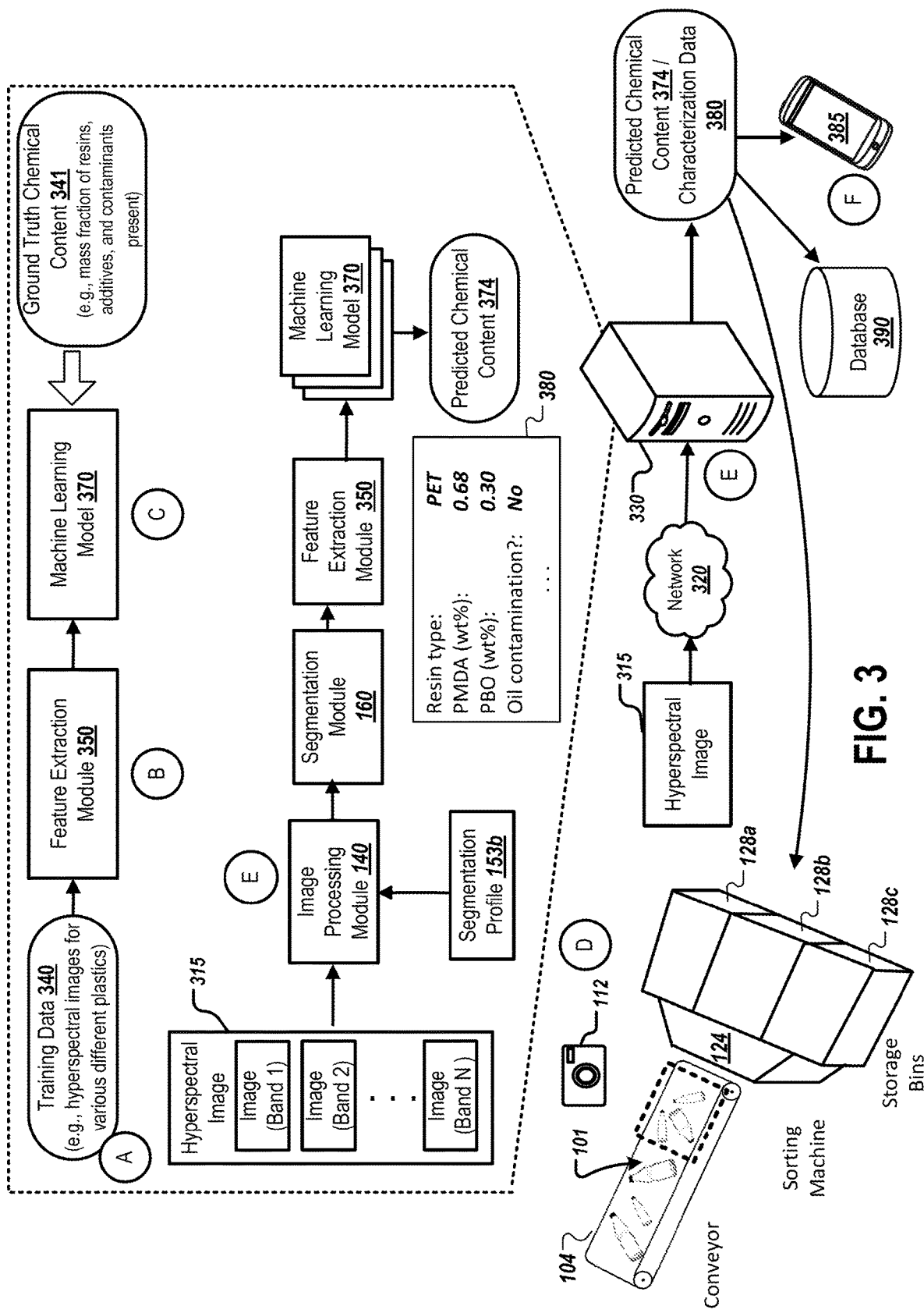
FIG. 3 shows an example flow of data according to embodiments of the present invention.

FIG. 3 shows an example flow of data. Stages (A) to (F) may occur in the illustrated sequence, or they may occur in a sequence that is different than in the illustrated sequence. In some implementations, one or more of the stages (A) to (F) may occur offline, where the computer system 330 may perform computations when the user device is not connected to the network 320. Stages (A) to (C) describe training the machine learning model 370, and stages (D) to (F) describe using the trained machine learning model 370. The machine learning model may be the model described in FIG. 1 or FIG. 2.

The network 320 can include a local area network (LAN), a wide area network (WAN), the Internet or a combination thereof. The network 320 can also comprise any type of wired and/or wireless network, satellite networks, cable networks, Wi-Fi networks, mobile communications networks (e.g., 3G, 4G, 5G, and so forth) or any combination thereof. The network 320 can utilize communications protocols, including packet-based and/or datagram-based protocols such as internet protocol (IP), transmission control protocol (TCP), user datagram protocol (UDP), or other types of protocols. The network 320 can further include a number of devices that facilitate network communications and/or form a hardware basis for the networks, such as switches, routers, gateways, access points, firewalls, base stations, repeaters or a combination thereof.

During stage (A), the computer system 330 obtains a set of training images 340. The set of training images 340 includes images of the plastics or other recyclable items to be analyzed. For example, to predict the resin type, additives, and contamination of plastic items, the set of training images 340 can include multiple hyperspectral images of different types of plastics, as well as example hyperspectral images of plastics having different additives and different types of contamination. The hyperspectral images may be images taken by multiple camera systems, with each camera system sensitive to a different wavelength range (e.g., MWIR, SWIR, NIR, VNIR). The examples with additives and contaminants can include examples with different concentrations and different combinations, as well as examples for each of multiple different base resin types (e.g., polyethylene (PE), polyethylene terephthalate (PET), polyvinyl chloride (PVC), polypropylene (PP), Acrylonitrile butadiene styrene (ABS), polycarbonate (PC), polyamide (PA), polystyrene (PS), etc.).

Each hyperspectral image in the set of training images 340 is associated with a ground truth label 341 indicating the actual properties of the item imaged. For example, the ground truth labels 341 can include information for any of the properties that the models 370 will be trained to predict, such as resin type, whether different additives or contaminants are present, the amount or concentration of each of different additives or contaminants, a higher resolution spectrum, and so on. In some implementations, the ground truth labels 341 can indicate a mass fraction or other measure of resins, additives, and contaminants present. In some embodiments, ground truth labels 341 may include an FTIR spectrum or an identification of an object being black or dark. The information in the ground truth labels 341 can be determined through testing of the samples imaged, higher resolution spectroscopy of the samples, or by looking up characteristics of the materials from manufacturing data or reference data for the types of objects imaged. To allow for training of a robust model, the training images 340 can include images of samples taken with different camera systems, different illumination levels, different distances of camera to subject, different orientations or poses of samples, and so on for a similar set of wavelength ranges.

During stage (B), the computer system 330 uses a feature extraction module 350 to process hyperspectral images and generate input features to provide to the machine learning models 370. The processing of a hyperspectral image can include several steps. The system 330 segments the training image into regions of different types. The different types can correspond to different parts of the type of object the model 370 is being trained to analyze. For example, different region types can be determined for regions of different base resin types, or areas of contamination and areas that are not contaminated. Another type of region can refer to background pixels that show the environment or surroundings of the sample 101 but not the sample 101 itself. In the example, images used for training are segmented, and the regions corresponding to a non-contaminated area are used for determining feature values for predicting resin content and additive properties, while contaminated regions are used to generate feature values for predicting the type and concentration of contaminants.

The feature extraction module 350 can also determine the values of various different features. These features can be the average pixel intensity in the selected, segmented regions of the training image for each of different spectral bands. For example, an average intensity for band 1 can be provided, an average intensity for band 2 can be provided, and so on. The average intensity values for a selected set of spectral bands can be used as an input vector for input to the machine learning model 370 during training. The different spectral bands may be from multiple camera systems, each camera system sensitive to a different wavelength range.

Different models 370 can be generated and trained to predict different properties. For example, five different classifiers may be trained for five different base resins, each being trained to predict the likelihood that an image region shows the corresponding base resin. Similarly, ten different models can be trained to each predict the concentration of one of ten different additives. As another example, to characterize the content of three different contaminants, three different contaminant models can be generated, one for each contaminant type of interest. In some cases, models can be even more specialized, such as a first set of models trained to predict concentration of different additives in PET samples, a second set of models trained to predict concentration of different additives in PE samples, and so on. Each of the different chemicals to be detected and measured can have different responses to the various spectral bands of hyperspectral images. As a result, the various models 370 to predict different chemical properties may be configured and trained to use input data of different subsets of the spectral bands of the hyperspectral image. The bands used for each model 370 can be selected to best identify the property of interest and, in some cases, to best distinguish from the presence of other materials that are frequently present.

In some implementations, the computer system 330 can perform analysis to determine which spectral bands are most effective to predict the type of property each model 370 is being trained to predict. For example, prior to the training in step (B), the computer system 330 can perform an analysis process to examine the predictive value of different spectral bands individually or collectively to determine a combination of bands that provides the greatest accuracy of prediction for predicting the chemical content of a particular chemical (e.g., a particular resin, additive, or contaminant). This allows dimensionality reduction and smaller models while often improving accuracy. In general, hyperspectral images have dozens of bands depending on the imaging technique used to capture the image, and not all of the bands provide useful information for predicting the chemical content for a desired chemical. The system can select a subset of bands, including potentially augmented or synthetic bands that combine data from different bands together, that provide information about desired types of chemical content to be predicted, based on the correlation or predictive value identified through analysis of example data.

The bands or combinations of bands that provide the best accuracy for each chemical property to be predicted can be identified by the system 330. For example, various different models (e.g., a set of regression trees, support vector machines, etc.) can be trained based on data from different individual bands, and the performance of the different models can be tested and compared. The models having the highest accuracy are identified, and then new models are trained in another iteration, where the new models use different pairs of the bands that resulted in the most accurate models in the first set. For example, if there are 20 spectral bands in the hyperspectral images, the first iteration can train 20 models to each predict the concentration of the same plastic additive using data for a single one of the spectral bands. Then, the bands respectively used by the highest-accuracy subset of the models (e.g., the top n models where n is an integer, or the set of models that provide accuracy above a threshold) are identified. If five bands are selected as most related to the plastic additive, then the next evaluation iteration can train another 10 models to predict the concentration of the same plastic additive, each one using a different pair of the five selected bands from the previous iteration. Optionally, the five bands can be combined in different ways to generate augmented or synthetic bands which can be additionally or alternatively used to train and test models. The iterations can continue until at least a minimum level of accuracy is reached or until performance fails to increase by more than a threshold amount. This same overall technique can be used to assess which other different spectroscopic techniques, e.g., X-ray fluorescence, laser-induced breakdown spectroscopy, etc., or which portions of the results of these techniques, are most predictive of different chemical properties.

Other techniques can be used to select the subsets of bands used to train different models 370. For example, the computer system 330 can access data describing reference hyperspectral data showing the response for pure or high-concentration samples, and the system can identify the bands that have high and low intensity that respectively show the bands that are most and least affected by the presence of the plastic additive. As another example, hyperspectral images for different known concentrations of a chemical can be compared to identify which bands vary the most as concentration changes, thus indicating which bands are most sensitive to changes in concentration.

During stage (C) the computer system 330 uses the feature values determined from training images to train the machine learning models 370. In some implementations, the models 370 are decision trees, such as gradient boosted regression trees (e.g., XG boost trees). In other implementations, each model 370 may be a neural network, a support vector regression model, or another type of model. Each machine learning model 370 includes a plurality of parameters that have values that are adjusted during training. Training the machine learning model involves adjusting the trainable parameters of the machine learning model so that the machine learning model 370 can predict the level of content of one or more chemicals by processing the set of input feature values, e.g., an average intensity value for each of a predetermined set of spectral bands selected for that model 370. The input values can be determined from the selected segmented areas of the training image that are relevant to the chemical being characterized (e.g., areas segmented as contaminated used to generated input for the contaminant characterization models 370). When a gradient boosted decision tree is used as the model type, a gradient boost training algorithm can be used. In other implementations, a neural network may be used, and backpropagation of error and other neural network training techniques can be used.

Training can proceed with different training examples until the models 370 can predict the desired property or properties, e.g., an amount or concentration of a compound. In the case of analyzing plastics, with an appropriate set of training data and sufficient iterations, the model 370 can be trained to predict a mass fraction of each of different additives at an accuracy that matches or exceeds the level provided by typical destructive testing. Similarly, the models 370 can be trained to predict the resin types present, whether different contaminants are present and the amounts or concentrations present, and higher resolution spectra of the plastic.

After the models 370 are trained, the models 370 can be used to make predictions for objects based on images of the objects. During stage (D), the camera system 112 captures a hyperspectral image 315 of the sample 101, which is an image of a region on the conveyor 104 that shows one or more objects to be sorted. Camera system 112 may include hyperspectral camera 112a and hyperspectral camera 112b. The hyperspectral image 315 includes image data for spectral bands outside the visible spectrum in addition to or instead of for spectral bands in the visible range. For example, the camera system 112 captures the hyperspectral image 315 of the sample 101. The image 315 includes multiple images (e.g., image 1, image 2 . . . image N) representing the spatial dimensions where each of the images has a different wavelength and/or band (e.g., Band 1, Band 2 . . . Band N). The multiple images may be from multiple cameras. When appropriate, the camera system 112 can also acquire scan results for X-ray fluorescence spectroscopy, laser-induced breakdown spectroscopy, Raman spectroscopy, or other spectroscopic techniques, which can provide additional bands of data about the objects on the conveyor 104. The camera system 112 provides the image data for the image 315, as well as any other related spectroscopic results, to the computer system 330 over the network 320.

During stage (E), the computer system 330 receives the image 315 via the network 320 (or directly over a wired or wireless connection) and processes the data using the machine learning models 370 to determine chemical properties of one or more objects in the waste stream. This can include detecting the presence of different chemicals and estimating the level of chemical content present for each of multiple different chemicals. When the waste stream shows different items (e.g., different bottles in this example), the processing can be done for each item individually, to characterize the chemical content of each and sort each item appropriately. In this example, upon receiving the image 315, the computer system 330 processes the image 315 to predict the resin type, additives present, and contaminants present, and the concentrations of each of these compounds, for each plastic object identified from the in the image 315.

The feature extraction module 350 processes the image 315, including segmenting the image to identify portions of the image 315 that represent the different objects in the sample 101 (e.g., the different bottles rather than background), and more specifically to identify portions of the image 315 that show a particular type of region (e.g., a region of PET versus PE; a contaminated region versus a clean region, etc.). Using the selected subset of segmented regions, the module 350 determines values for each of a predetermined set of features. The features can correspond to different spectral bands that have been selected for use in predicting the chemical property or properties of interest. In other words, data for different combinations of bands can be used to provide input to different models 370. In addition, the data for those bands can be taken from the specific segmented region(s) relevant to the model, e.g., using segmented regions of contamination only to generate input features for the models trained to predict contaminant concentration. For example, the features may be average intensity for each of a subset of spectral bands in the image 315. When data for other spectroscopic techniques is obtained, feature values for these spectroscopic results can also be generated and provided as input to the models 370 to generate estimates of chemical content. As a result, a set of feature values is determined for the image 315, with each feature value representing an average intensity value for a different spectral band (which may be an augmented band) in a predetermined set of spectral bands, where the averages are determined over the segmented regions identified as the region type corresponding to the model. The predetermined set of spectral bands can be the same set of spectral bands for which information was provided to the respective models 370 during training.

The feature values generated by the feature extraction module 550 are provided as input to the trained machine learning models 370. As noted above, those can be different sets of feature values for each model 370, determined based on the subset of bands selected as most related to or most effective for predicting the property the model 370 predicts. The machine learning models 370 process the input feature values using the training state determined during training, e.g., using the parameter values as set in stage (C) discussed above. The models 370 can each produce an output 374 that indicates a predicted (e.g., inferred or estimated) characteristic (e.g., level of content of one or more chemicals, higher resolution spectrum, and/or identity as black/dark) that the model 370 has been trained to predict. For example, different models 370 can each provide a regression output (e.g., a numerical value) that indicates mass fraction of a different additive. The type of measurement used in the prediction can be the same type used for the ground truth labels 341 used in the training of the model 370.

In examples, the segmentation results and model outputs are combined to characterize an object. For example, characterization data 380 for one object indicates that the object is formed of PET, that an additive pyromellitic dianhydride (PMDA) is present with a mass fraction of 0.68, an additive polybenzoxazole (PBO) is present with a mass fraction of 0.30, and that the object is not contaminated with oil. Each of these elements can be predicted using a different model 370 that uses a corresponding set of bands of information. Some features, such as the resin type and whether contamination is present, can be determined based on the segmentation results, which in this example can segment the object as a PET object and show that there are no contaminated regions. In some implementations, based on the base resin type identified through segmentation or output of models 370, the system 330 can select which models 370 to use to detect different additives and contaminants. For example, one set of models can be trained to detect additives in the presence of PET, while other sets of models can be trained to detect the same or different additives in other resin types. This can enable each model to more accurately focus on the spectral features that distinguish each additive from the different resin types, which may result in higher accuracy concentration results than a general model for multiple resin types.

During stage (F), data indicating the characterization data 380 is provided to a device. For example, the data 380 can be stored in a database 390 or other data storage, in association with a sample identifier, time stamp, and potentially context data such as a sample type, location, etc. As a result, individual objects can be tagged or associated with metadata that indicates the chemical content (e.g., chemicals present, the amounts or concentrations of the chemicals, etc.) estimated using the models. As another example, the data 380 can be provided to one or more user devices 385, such as a smartphone, tablet, laptop computer, desktop computer, etc., for presentation to a user in a user interface.

In the example, the predicted chemical content is assessed by the computer system 330 or another device and used to sort the objects in the waste stream. For example, the chemical content can be compared with one or more thresholds that correspond to different bins 128a-128c, conveyors, or other output streams. The predictions can then be used by the computer system 330 or another system to control sorting equipment, such as the sorting machine 124, that is configured to move objects to different areas or containers. Different categories of objects (e.g., groups having different chemical properties) can be processed differently for mechanical or chemical recycling. In some implementations, the properties of the waste stream overall can be assessed and accumulated to determine the overall mix of plastics and other compounds along the conveyor 104. Even if the items are not sorted, the information about the nature of the waste stream can be used to adjust parameters of chemical recycling of the waste stream, such as to adjust the concentration of different inputs, solvents, or catalysts used, or to adjust other recycling parameters. As another example, a user can be presented an alert if the chemical content is above a maximum level, below a minimum level, inside a range, outside a range, or satisfies another predetermined condition.

The techniques of FIG. 1 can also be applied to assess other types of materials, such as plastics and other recyclables. For example, the techniques may be used to improve the efficiency and accuracy of characterizing chemical or material identities of waste materials, allowing items to be sorted by material type, presence and amount of additives, presence and amount of contaminants, and other properties determined through computer vision. This analysis can be used to improve both mechanical and chemical recycling processes.

Mechanical recycling is the dominant strategy for recycling plastic and involves grinding, melting, and re-extruding plastic waste. Recycling facilities are frequently designed to process streams of sorted materials with high purity, to retain a high level of material performance in recycled products. However, feedstock impurity reduces the effectiveness of recycling, due to complex formulations with additives, as well as the physical degradation of materials, even just after a few cycles of mechanical recycling. For example, with plastic materials, polylactic acid (PLA) is a common waste plastic often undetected in polyethylene terephthalate (PET) sorting and mechanical recycling operations. As another example, chlorinated compounds such as polyvinyl chloride (PVC) are not tolerated in both mechanical and chemical recycling operations, because corrosive compounds are produced during recycling processes, which limits the value of hydrocarbon outputs.

Chemical recycling may resolve some limitations of mechanical recycling by breaking the chemical bonds of waste materials into smaller molecules. For example, in the case of polymeric materials, chemical recycling may provide an avenue to recover oligomers, monomers, or even basic molecules from a plastic waste feedstock. In the case of polymers, chemical recycling processes may include operations to depolymerize and dissociate the chemical makeup of a complex plastic product, such that its by-products can be up-cycled into feedstocks for new materials. Elements of chemical recycling may permit a material to be repeatedly dissociated into primary feedstock materials. In this way, rather than being limited by chemical structure and material integrity to a limited number of physical processes, as in mechanical recycling, chemical recycling may be integrated into an 'end-to-end' platform to facilitate reuse of molecular components of recyclable materials. For example, the products of chemical recycling may include basic monomers (ethylene, acrylic acid, lactic acid, vinyl, etc.), feedstock gases (carbon monoxide, methane, ethane, etc.), or elemental materials (sulfur, carbon, etc.). Instead of being limited to a single group of recycled products, based on the molecular structure of the input waste material, products may be identified that can be synthesized from intermediary chemicals that can be produced from the waste by chemical reactions. In so doing, the end-to-end platform may manage a waste stream by generating a chemical reaction scheme to convert the waste material into one or more target products. For example, the end-to-end platform may direct a waste feedstock to a chemical recycling facility, for chemical conversion of the waste material into a target product.

In some embodiments, the waste material that is imaged and analyzed may include, but is not limited to, polymers, plastics, composite materials containing plastics, non-plastics, ligno-cellulosic materials, metal, glass, and/or rare-earth materials. The polymeric and plastic materials may include materials formed by one or more polymerization processes and may include highly cross-linked as well as linear polymers. In some cases, the waste material may include additives or contaminants. For example, a plastic material may include a plasticizer, flame retardant materials, impact modifiers, rheology modifiers, or other additives included in the waste stream 108, for example, to impart desired properties or facilitate formation properties. In some cases, the waste material may incorporate a constituent chemical or element that may be incompatible with a broad range of chemical recycling processes, and, as such, the characterization data 380 may include information specific to such chemicals. For example, decomposition of halogen or sulfur containing polymers may produce corrosive byproducts that may inhibit or impair chemical recycling of waste materials that include such elements. An example of a waste material containing a halogen constituent is polyvinyl chloride (PVC). Decomposition of PVC, for example, may generate chlorine containing compounds that may act as corrosive byproducts.

Figure 4:
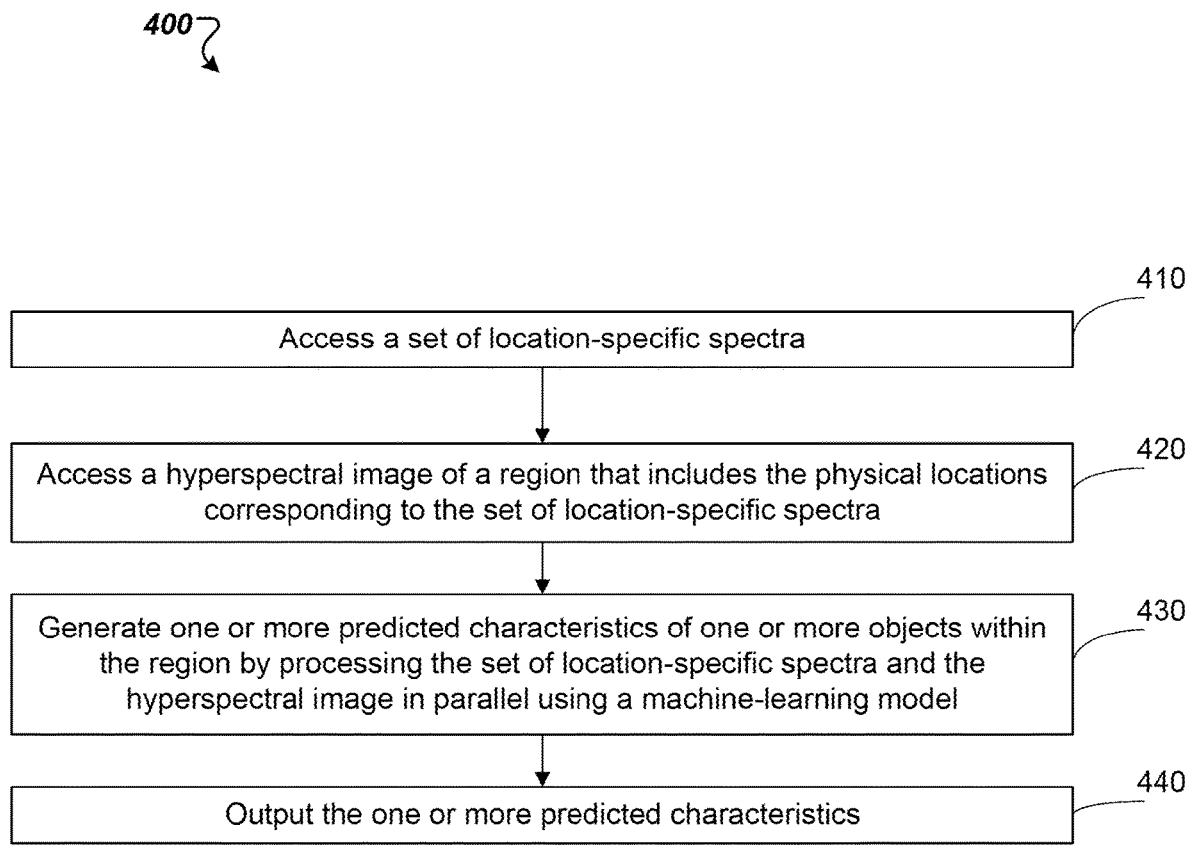
FIG. 4 is a flowchart of a process for predicting characteristics of objects according to embodiments of the present invention.

FIG. 4 is a flowchart of an example process 400. Process 400 involves analyzing location-specific spectra from hyperspectral images to predict characteristics of objects. The objects may be plastic objects (i.e., polymer-based objects). More specifically, the objects may be objects to be sorted for recycling or further processing. The objects may include black or dark colored objects. A "dark" object may include an object that absorbs at least 90%, 95%, or 97%, or 99% of light in the visible wavelengths. In some implementations, one or more process blocks of FIG. 4 may be performed by one or more components of system 100.

At block 410, process 400 may include accessing a set of location-specific spectra. Each location-specific spectrum in the set of location-specific spectra characterizes an extent to which electromagnetic radiation at each of a first set of frequency bands was reflected by a material located at a physical location corresponding to the location-specific spectrum. The set of location-specific spectra may include a set of mid-wave infrared radiation (MWIR) spectra. For example, the first set of frequency bands may include MWIR frequencies. In embodiments, the set of location-specific spectra may include a set of small-wave infrared radiation (SWIR) spectra. For example, the first set of frequency bands may include SWIR frequencies.

The set of location specific spectra may characterize an extent to which electromagnetic radiation at each of either a first set of frequency bands or a second set of frequency bands was reflected. The first or second set of frequency bands may include frequencies associated with MWIR, SWIR, near infrared (NIR), visible and near infrared (VNIR) (about 300 to 1,000 nm), X-ray fluorescence, X-ray diffraction (XRD), millimeter-wave, Fourier-transform infrared (FTIR), or spectroscopic techniques. At least one location-specific spectrum may include a first set of frequency bands and at least one location-specific spectrum may include a second set of frequency bands. In embodiments, the first set of frequency bands may not overlap with the second set of frequency bands. In some embodiments, the first set of frequency bands may have 5% or less, 10% or less, 20% or less, or 25% or less of the frequency bands overlap with the second set of frequency bands. In some embodiments, the set of location specific spectra may include a third set of frequency bands. For example, the set of location specific spectra may include MWIR, SWIR, and NIR or VNIR.

At block 420, process 400 may include accessing a hyperspectral image of a region that includes the physical locations corresponding to the set of location-specific spectra. In embodiments, the set of location specific spectra and the hyperspectral image may be collected at a system that includes a first camera sensitive to short-wave infrared radiation, a second camera sensitive to mid-wave infrared radiation, and a conveyor belt configured to move the one or more objects. The system may be system 100. A camera may be sensitive to the set of frequency bands. For example, the first camera may be sensitive to the first set of frequency bands. The second camera may be sensitive to the second set of frequency bands.

At block 430, process 400 may include generating one or more predicted characteristics of one or more objects within the region by processing the set of location-specific spectra and the hyperspectral image in parallel using a machine learning model. The machine learning model may be trained using multiple loss functions, where each of the multiple loss functions depends on an accuracy of the one or more predicted characteristics. In embodiments, the machine learning model may include multiple two-dimensional convolutional layers. The machine learning model includes at least one fully connected dense layer. The machine learning model may include at least one max pooling layer. The machine learning model may be any machine learning model described herein, including machine learning model 370 of FIG. 3. The machine learning model may be trained as described in FIG. 3.

At block 440, process 400 may include outputting the one or more predicted characteristics. As an example, the one or more predicted characteristics may include a prediction as to whether the one or more objects are black or dark. In some embodiments, the one or more predicted characteristic may include a predicted classification of a base polymer (e.g., a base resin) in the one or more objects. The one or more predicted characteristics may include whether a material or object includes a given additive, any of a class of additives, a given contaminant, any of a class of contaminants, or any of a class of base polymers. In some embodiments, the one or more predicted characteristics may include a prediction of a suitability of a material of the one or more objects for polyolefin-class chemical or other class recycling. The suitability may be binary (e.g., suitable or not suitable) or have more levels of classification (e.g., a scale from 1 to 10 or 0 to 1) to denote the probability or ease of recycling.

In embodiments, the one or more predicted characteristics may include a predicted higher resolution spectrum that has smaller frequency bands as compared to the first set of frequency bands. The higher resolution spectrum may include FTIR. In embodiments, the higher resolution spectrum may be further analyzed to determine the characterization of the base polymer, level of contamination, and/or suitability for recycling.

In embodiments, the one or more predicted characteristics may be predicted sequentially. For example, the item may be determined to be black and dark. Afterward, the higher resolution spectrum may be predicted. The base polymers and/or contaminants may then be predicted after the higher resolution spectra. In some embodiments, one or more of the predicted characteristics may be predicted in parallel. For example, the higher resolution spectrum and the base polymer(s) may be predicted without depending on results from the other prediction.

Process 400 may include additional implementations, such as any single implementation or any combination of implementations described below and/or in connection with one or more other processes described elsewhere herein.

In some embodiments, process 400 further includes generating a first hypercube that includes the set of location-specific spectra. Each of a first dimension and a second dimension of the first hypercube may correspond to a dimension in physical space. A third dimension of the first hypercube may correspond to the first set of frequency bands. Process 400 may further include generating a second hypercube using the hyperspectral image. Each of a first dimension and a second dimension of the second hypercube may correspond to a dimension in physical space. A third dimension of the second hypercube may correspond to a second set of frequency bands. Processing the set of location-specific spectra and the hyperspectral image in parallel includes processing the first hypercube and the second hypercube. The first hypercube may be generated using a first hyperspectral camera. The second hypercube may be generated using a second hyperspectral camera, sensitive to different wavelengths than the first hyperspectral camera.

In some embodiments, process 400 may be extended to more than two sets of frequency bands. For example, the set of location-specific spectra may characterize an extent to which electromagnetic radiation at each of a first set of frequency bands, a second set of frequency bands, or a third set (or more sets) of frequency bands. The set of location-specific spectra may include at least one spectrum having the first set of frequency bands, at least one spectrum having the second set of frequency bands, and at least one spectrum having the third set of frequency bands, and so on. Each set of frequency bands may be acquired using a different camera sensitive to the set of frequency bands. The set of frequency bands may be any frequency bands described herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed may be resorted to by those skilled in the art, and that such modifications and variations are considered to be within the scope of this disclosure as defined by the appended claims.

EXAMPLES

The systems and methods implemented in various embodiments may be better understood by referring to the following examples.

A camera that is sensitive to SWIR and a camera that is sensitive to MWIR were included in a "sensor pod" The camera sensitive to SWIR was a Specim FX 17 camera, and the camera sensitive to MWIR was the Specim FX50 camera. The sensor pod was fixed in series above a conveyor belt and connected directly to a computer system. Samples are illuminated using a collection of high intensity halogen lights (which produce significant SWIR) or LEDs in the same wavelength range, as well as an electric filament-based heater with gold-plated reflectors (which produces significant MWIR). The cameras capture light reflected off objects (and the underlying belt/conveyor system) as they pass under the radiation sources, generating a spectral and spatial image. These object images were captured and segmented as described in U.S. application Ser. No. 17/383,278, filed on Jul. 22, 2021 and Ser. No. 17/383,293, filed on Jul. 22, 2021, each of which is hereby incorporated by reference in its entirety for all purposes, to generate a spectral hypercube (A) of the pixels making up that object's image. These spectral hypercubes were collected and passed through a computer system that controlled both machine learning models and a database of diverse spectra. A color (RGB) line scan camera may also be included to segment an image feed and determine a bounding box. The bounding box may be propagated up to three hyperspectral cameras, including MWIR, SWIR, and/or VNIR (visible and NIR). They hypercubes may be concatenated (along with the RGB image) and fed into the model.

The spectral hypercube corresponding to MWIR wavelengths was extracted from the bounding box output from the segmentation model. This bounding box was broadcasted to the SWIR image and used to extract the spectral hypercube corresponding to the SWIR wavelengths. The hypercubes from both the sensor modalities (SWIR and MWIR) were concatenated and passed as input to a deep neural network trained to predict multiple outputs in parallel. The deep neural network, while consisting of multiple paths, shared a common spine to reduce the spatial dimensions of the concatenated hypercube. The different paths were trained in parallel to learn model parameters to (a) classify whether the plastic is black or not, (b) classify the base polymer category for example PE, PET, PVC, PP, etc., (c) classify the suitability of the plastic for chemical recycling in terms of polyolefin class, and/or (d) predict a higher resolution FTIR spectra that may reveal associated additives and/or contaminants. The deep neural network included 2D convolutional layers, fully-connected dense layers and max pooling layers. Since the neural network was designed for multiple outputs (such as black plastic class, base polymer class, polyolefin class, high resolution FTIR output, each with its own loss function), the final loss was weighted to learn network parameters optimized for all outputs. The models, which were trained on a large spectral database, then associated the hypercube (A) based on its prominent features to predict a higher resolution FTIR spectra.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Also, although several applications of providing incentives for media sharing and methods have been described, it should be recognized that numerous other applications are contemplated. Accordingly, other implementations are within the scope of the following claims.

What is claimed is:

1. A method comprising:
  accessing a set of location-specific spectra, wherein each location-specific spectrum in the set of location-specific spectra characterizes an extent to which electromagnetic radiation at each of a first set of frequency bands was reflected by a material located at a physical location corresponding to the location-specific spectrum;
  accessing a hyperspectral image of one or more objects in a region of a conveyor belt that includes a plurality of physical locations corresponding to the set of location-specific spectra;
  generating one or more predicted characteristics of the one or more objects within the region by processing the set of location-specific spectra and the hyperspectral image in parallel using a machine learning model; and
  outputting the one or more predicted characteristics, wherein the predicted characteristics include a base polymer composition of each of the one or more objects.

2. The method of claim 1, further comprising:
  generating a first hypercube that includes the set of location-specific spectra, wherein:
    each of a first dimension and a second dimension of the first hypercube correspond to a dimension in physical space, and
    a third dimension of the first hypercube corresponds to the first set of frequency bands; and
  generating a second hypercube using the hyperspectral image, wherein:
    each of a first dimension and a second dimension of the second hypercube correspond to a dimension in physical space,
    a third dimension of the second hypercube corresponds to a second set of frequency bands, and
    processing the set of location-specific spectra and the hyperspectral image in parallel includes processing the first hypercube and the second hypercube.

3. The method of claim 1, wherein the one or more predicted characteristics further includes a prediction as to whether the one or more objects are black.

4. The method of claim 1, wherein the one or more predicted characteristics further includes a prediction of a suitability of the material of the one or more objects for polyolefin-class chemical recycling.

5. The method of claim 1, wherein the one or more predicted characteristics further include a predicted higher resolution spectrum that has smaller frequency bands as compared to the first set of frequency bands.

6. The method of claim 1, wherein:
the one or more predicted characteristics includes multiple characteristics,
the machine learning model was trained using multiple loss functions, and
each of the multiple loss functions depends on an accuracy of the one or more predicted characteristics.

7. The method of claim 1, wherein the machine learning model includes multiple two-dimensional convolutional layers.

8. The method of claim 1, wherein the machine learning model further includes at least one fully connected dense layer.

9. The method of claim 1, wherein the machine learning model further includes at least one max pooling layer.

10. The method of claim 1, wherein the set of location-specific spectra includes a set of mid-wave infrared radiation spectra.

11. The method of claim 1, wherein the set of location-specific spectra includes a set of small wave infrared radiation spectra.

12. The method of claim 1, wherein the set of location specific spectra and the hyperspectral image were collected at a system that includes a first camera sensitive to short-wave infrared radiation, a second camera sensitive to mid-wave infrared radiation, and the conveyor belt configured to move the one or more objects.

13. The method of claim 1, wherein the set of location-specific spectra includes a set of spectra from 300 nm to 1,000 nm.

14. A computer-program product tangibly embodied in a non-transitory machine-readable storage medium, including instructions configured to cause one or more data processors to perform a method comprising:
accessing a set of location-specific spectra, wherein each location-specific spectrum in the set of location-specific spectra characterizes an extent to which electromagnetic radiation at each of a first set of frequency bands was reflected by a material located at a physical location corresponding to the location-specific spectrum;
accessing a hyperspectral image of one or more objects in a region of a conveyor belt that includes a plurality of physical locations corresponding to the set of location-specific spectra;
generating one or more predicted characteristics of the one or more objects within the region by processing the set of location-specific spectra and the hyperspectral image in parallel using a machine learning model; and
outputting the one or more predicted characteristics, wherein the predicted characteristics include a base polymer composition of each of the one or more objects.

15. The computer-program product of claim 14, the method further comprising:
generating a first hypercube that includes the set of location-specific spectra, wherein:
each of a first dimension and a second dimension of the first hypercube correspond to a dimension in physical space, and
a third dimension of the first hypercube corresponds to the first set of frequency bands; and
generating a second hypercube using the hyperspectral image, wherein:
each of a first dimension and a second dimension of the second hypercube correspond to a dimension in physical space,
a third dimension of the second hypercube corresponds to a second set of frequency bands, and
processing the set of location-specific spectra and the hyperspectral image in parallel includes processing the first hypercube and the second hypercube.

16. The computer-program product of claim 14, wherein the one or more predicted characteristics further include a predicted higher resolution spectrum that has smaller frequency bands as compared to the first set of frequency bands.

17. A system comprising:
one or more data processors; and
a non-transitory computer readable storage medium containing instructions which, when executed on the one or more data processors, cause the one or more data processors to perform a method comprising:
accessing a set of location-specific spectra, wherein each location-specific spectrum in the set of location-specific spectra characterizes an extent to which electromagnetic radiation at each of a first set of frequency bands was reflected by a material located at a physical location corresponding to the location-specific spectrum;
accessing a hyperspectral image of one or more objects in a region of a conveyor belt that includes a plurality of physical locations corresponding to the set of location-specific spectra;
generating one or more predicted characteristics of the one or more objects within the region by processing the set of location-specific spectra and the hyperspectral image in parallel using a machine learning model; and
outputting the one or more predicted characteristics, wherein the predicted characteristics include a base polymer composition of each of the one or more objects.

18. The system of claim 17, further comprising:
a first camera sensitive to short-wave infrared radiation,
a second camera sensitive to mid-wave infrared radiation, and
the conveyor belt configured to move the one or more objects.

19. The system of claim 18, further comprising:
a third camera sensitive to visible and near infrared light.

* * * * *